V. LAUER.
TWO-ROW HEADER.
APPLICATION FILED JUNE 3, 1913.

1,104,911.

Patented July 28, 1914.
3 SHEETS—SHEET 1.

Fig. 1.

WITNESSES

Victor Lauer, INVENTOR

BY

ATTORNEY

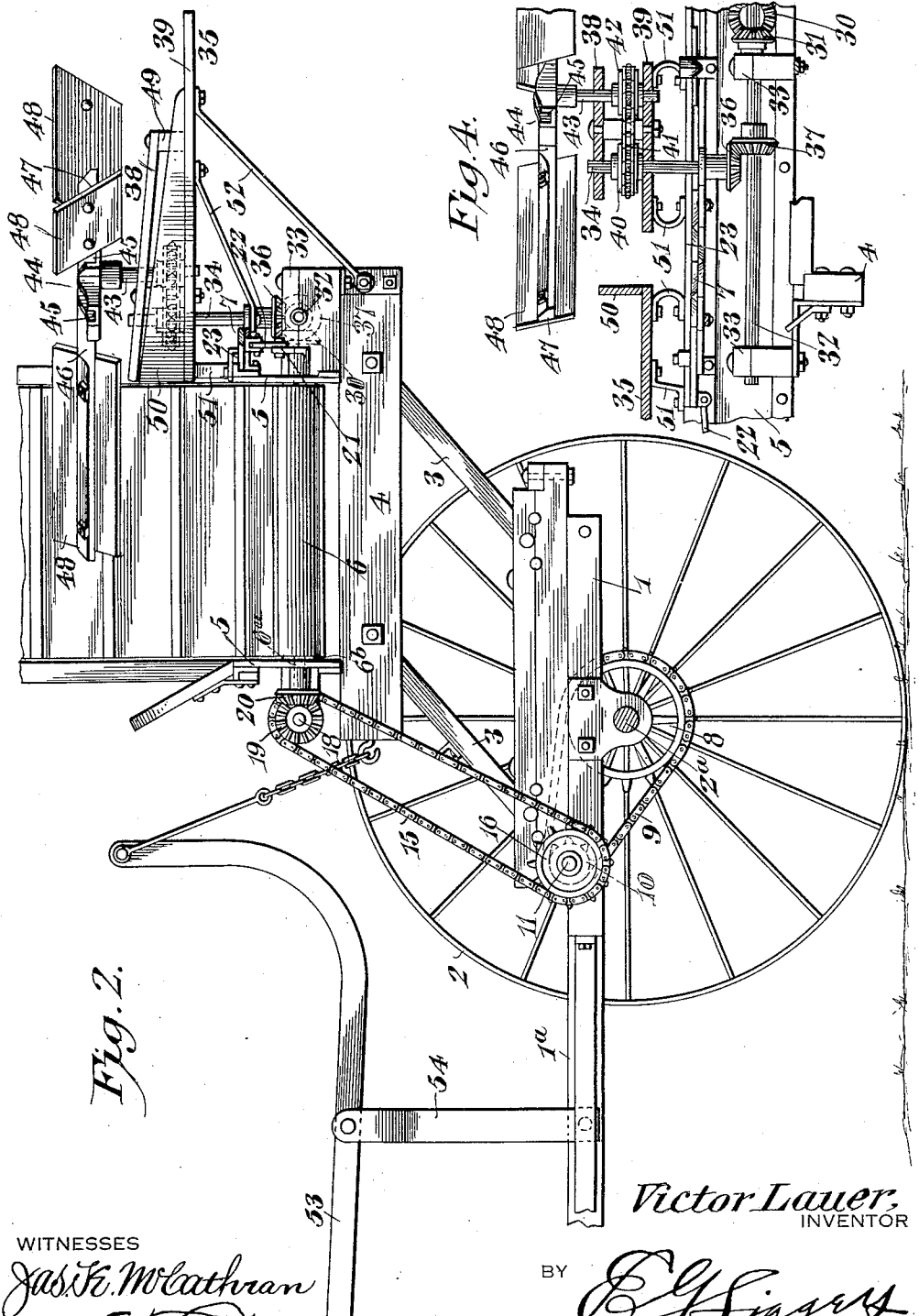

V. LAUER.
TWO-ROW HEADER.
APPLICATION FILED JUNE 3, 1913.
1,104,911.
Patented July 28, 1914.
3 SHEETS—SHEET 3.
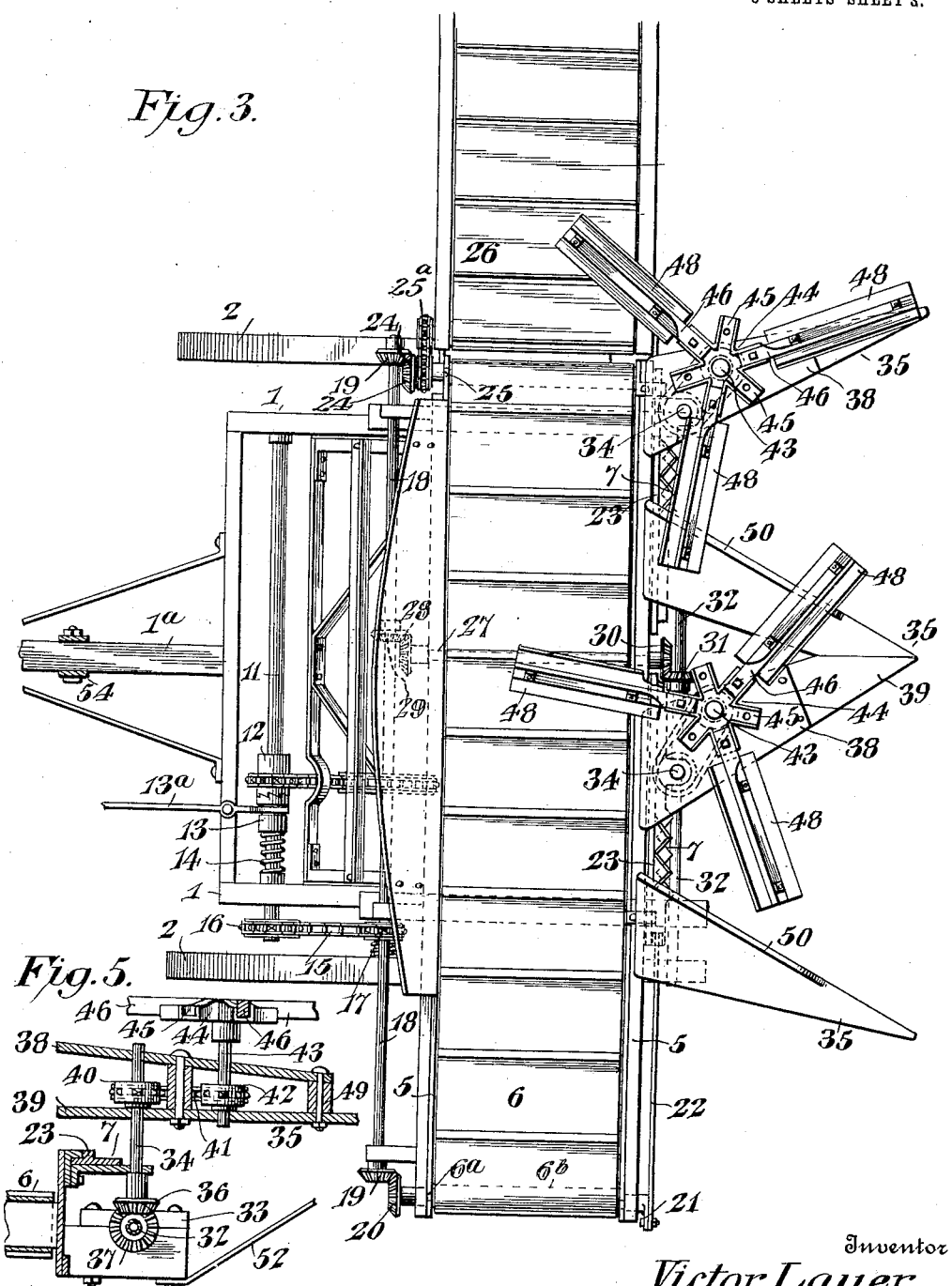
Witnesses
Jas. K. McCathran
J. F. Riley
Inventor
Victor Lauer,
By E. G. Siggers
Attorney

UNITED STATES PATENT OFFICE.

VICTOR LAUER, OF STILLWATER, OKLAHOMA.

TWO-ROW HEADER.

1,104,911.  Specification of Letters Patent.  Patented July 28, 1914.

Application filed June 3, 1913. Serial No. 771,508.

*To all whom it may concern:*

Be it known that I, VICTOR LAUER, a citizen of the United States, residing at Stillwater, in the county of Payne and State of Oklahoma, have invented a new and useful Two-Row Header, of which the following is a specification.

The invention relates to improvements in two row headers.

The object of the present invention is to improve the construction of two row headers, more especially that shown and described in Patent No. 1,052,833, granted to me Feb. 11, 1913, and to equip the same with horizontally disposed rotary reels having blades set at an angle and adapted to flex or bend the stalks of Kafir corn and other grain over the cutting mechanism to facilitate the severing of the heads and to cause the latter to be positively delivered to a conveyer, whereby the efficiency of the header is materially increased and loss of grain reduced to a minimum.

The invention also has for its object to equip the header with grain deflectors capable of guiding the grain to the cutters and of forming housings for protecting the gearing for rotating the reels, whereby the grain will be prevented from being bruised by the gearing and also from clogging the same.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings: Figure 1 is a perspective view of the front portion of a two row header, constructed in accordance with this invention. Fig. 2 is a side elevation of the same. Fig. 3 is a plan view of the front portion of the header. Fig. 4 is an enlarged detail vertical sectional view of the front portion of the header. Fig. 5 is a similar view, taken transversely of the front portion of the header.

Like numerals of reference designate corresponding parts in all the figures of the drawings.

In the accompanying drawings in which is illustrated the preferred embodiment of the invention, the header comprises in its construction a main frame 1 supported on traction wheels 2 and designed to be connected by a tongue $1^a$ with a rear seat carrying and guiding frame (not shown) to which in practice the draft animals are attached, as set forth in the aforesaid patent, but as the particular construction of the rear frame does not constitute a portion of the present improvement, illustration thereof is deemed unnecessary.

Upon the main frame 1 are pivotally mounted frames 3, extending across the main frame at spaced points and arranged to swing upwardly and downwardly in a direction longitudinally of the main frame 1 and carrying an upper frame 4, adapted to be raised and lowered to arrange the header at the proper elevation to suit the grain to be cut. Secured directly upon the upper frame 4 are spaced transversely disposed side bars 5 between which is mounted an endless belt or other form of conveyer 6, by which the severed heads of the grain are caught and conveyed to one side of the machine where they may be deposited upon the ground or discharged directly into a wagon driven alongside of the header.

The upper frame is equipped at the front with suitable cutters 7, preferably of the reciprocating type and mounted upon the front side bar 5. The reciprocating cutters 7 are actuated by gearing comprising a sprocket wheel 8, mounted upon the axle $2^a$ of the traction or supporting wheels 2 and connected by a sprocket chain 9 with a sprocket pinion 10 of a countershaft 11. The sprocket pinion 10 is mounted loosely on the shaft 11 and is provided at one side with a clutch hub 12, adapted to be engaged by a coacting clutch member slidably interlocked with the shaft 11 in any suitable manner so as to rotate therewith. The slidable clutch member 13, which is normally held in engagement with the clutch stand or hub 12 by a spring 14, may be disengaged therefrom by a suitable lever $13^a$ designed in practice to be operated from the driver's seat (not shown). A sprocket chain 15 passes around a sprocket pinion 16 on one end of the shaft 11 and around a sprocket pinion 17 fixed to a transversely disposed transmission shaft 18, which is journaled in suitable bearings upon the rear side bar 5 of the upper frame, as clearly illustrated in Fig. 3 of the drawings. The sprocket pinion 16 is keyed or otherwise secured to the shaft 11, and fixed to the ends of the transmission shaft are bevel pinions 19, one of which meshes with a bevel pinion 20 on the rear end of a longitudinally disposed shaft $6^a$, carrying a roller $6^b$ to impart movement to the conveyer 6 and equipped at its front end with a crank arm 21, which is connected by a pitman 22 with the cutter bar 23 of the cutting mechanism. The other pinion 19 of the transmission shaft meshes with a pinion 24 upon the rear end of a longitudinally disposed shaft 25, which, through the medium of sprocket gearing $25^a$ imparts motion to a lateral conveyer 26, if the severed heads of the corn or other grain are to be delivered into a traveling vehicle. Mounted at a point intermediate of the ends of the side bars 5 in suitable bearings thereof is a longitudinally disposed shaft 27, equipped at its rear end with a bevel pinion 28 meshing with a bevel pinion 29, keyed or otherwise secured to the transmission shaft, and the said shaft 27 is also provided at its front end with a bevel pinion 30, which meshes with a bevel pinion 31 on a transversely disposed reel driving shaft 32. The reel driving shaft 32, which is journaled in suitable bearings 33 at the front of the upper frame, is disposed below and slightly in advance of the cutter bar 23, so that it will not interfere with the operation of the cutters 7, and vertical shafts 34, which are actuated by the front transverse shaft 32, will be arranged out of the path of movement of the cutter bar 23. The vertical shafts 34 are mounted in deflectors or guides 35 arranged in pairs and extending forwardly from the frame of the machine for guiding the grain to the cutters 7. The lower ends of the vertical shafts 34 have keyed or otherwise secured to them bevel pinions 36, meshing with bevel pinions 37 fixed to the front transverse shaft 32.

The forwardly projecting guides or deflectors are preferably composed of upper and lower plates 38 and 39 in which the upper portions of the vertical shafts 34 are journaled to impart steadiness to the said shafts 34. Between the upper and lower plates 38 and 39 are arranged horizontal sprocket wheels 40 fixed to the vertical shafts 34 and connected by horizontal sprocket chains 41 with sprocket wheels 42, keyed or otherwise secured to the lower ends of the vertical reel carrying shafts 43. The shafts 43, are journaled in suitable bearings of the plates 38 and 39 of the deflectors or guides at such points that the reels carried by their upper ends will, in the operation of the header, engage the grain and force the same against the cutters 7. Secured to the upper ends of the shafts 43 are hub members 44 consisting of castings having a plurality of radial sockets 45 in which are secured the inner ends of radial spokes or arms 46, correspondingly beveled at one of their side faces 47. The arms or spokes 46 extend horizontally over the deflectors and are of a length to bridge the space between the members of each pair or set of deflectors as they successively swing around toward the cutters 7. To the beveled side faces 47 of the spokes or arms 46 are secured solid blades 48, which are set at an angle. The angularly disposed blades 48 are adapted in engaging the corn or other grain to bend or flex the stalks rearwardly over the cutters 7 and the conveyer 6, so that after the cutters sever the stalks, the heads of the grain will positively fall upon the conveyer. The sockets 45 are preferably formed with open tops so that the arms or spokes 46 may be readily secured in and removed from the sockets. The hub members are preferably provided with six radial sockets, although three blades will usually be found sufficient. By providing six or more sockets, a greater number of blades may be used, and with a six socket casting or hub member if one set of three blades should be broken, a new set may be secured to the hub member without losing the time required to remove the broken blades.

The upper and lower plates 38 and 39 constituting the guides or deflectors are spaced apart at the front by blocks 49, and side plates 50 are preferably secured to the side edges of the upper and lower plates 38 and 39 to completely house the sprocket chains 41 and the sprocket wheels 40 and 42, thereby preventing the plants from becoming entangled with and clogging the operation of such gearing or being bruised by the same. The deflectors are supported upon and above the upper frame 4 by means of brackets 51 and braces 52, secured to the upper frame 4 and extending forwardly and upwardly therefrom to the opposed edges of the deflectors. The members of each pair or set of guides or deflectors diverge forwardly, and the inner members of the two pairs or sets are connected at their outer ends, as clearly illustrated in Fig. 3 of the drawings. As the machine travels forwardly, the deflectors pass between and at opposite sides of two adjacent rows of plants and positively guide the same to the cutters. As the reels revolve in a horizontal plane, they will positively move in behind the grain and will force the same to the cutters and bend or flex the stalks so that the grain may be more readily cut and also will cause the severed heads to drop with certainty upon the conveyer. Also the inclination of the blades facilitates the passage of the same over the severed heads of the stalks to avoid impeding the progress of the machine. The upper frame is adjusted in its upward and downward movements by means of a horizontally disposed operating lever 53 fulcrumed at an intermediate point on a standard 54 and connected at its front arm with the upper frame and designed to have its rear arm extend to a point within easy reach of the driver's seat, as explained in the said patent.

What is claimed is:—

1. A header including cutting mechanism and a reel mounted on a vertical axis and having relatively rigid radial blades extending horizontally with relation to the axis of the reel and presenting front inclined faces extending upwardly and forwardly with relation to the direction of rotation of the reel and adapted to flex or bend the stalks over the cutting mechanism and to facilitate the passage of the reel through the grain.

2. A header including cutting mechanism and a reel mounted on a vertical axis comprising relatively rigid radial horizontal arms extending from the axis of the reel and correspondingly beveled at one side, and blades secured to the beveled sides of the arms and presenting front inclined faces extending upwardly and forwardly with relation to the direction of rotation of the reel and adapted to flex or bend the grain over the cutting mechanism.

3. A header including cutting mechanism, a reel mounted on a vertical axis and comprising a hub member provided with a plurality of sets of sockets arranged at intervals and having bottom and side walls and open at the top, and a set of radial horizontal arms secured in one set of the said sockets and extending from the axis of the reel, the other or empty socket permitting a new set of arms to be applied to the hub member in event of breakage of the first set without removing the broken arms, and blades secured to the arms and set at an inclination.

4. A header including a frame, cutting mechanism carried by the frame and disposed transversely of the header, a deflector mounted on the frame above the horizontal plane of the cutting mechanism and extending in advance of the said mechanism, a vertical shaft mounted on the deflector in advance of the transverse plane of the cutting mechanism, a reel mounted on the shaft for rotary movement, and gearing housed within the deflector and connected with the vertical shaft for rotating the reel.

5. A header including a frame, cutting mechanism carried by the frame and disposed transversely of the header, a plurality of deflectors mounted on the frame above the horizontal plane of the cutting mechanism and extending in advance of the same for guiding the grain to the said cutting mechanism, said deflectors comprising upper and lower blades and connecting side plates forming housings, vertical shafts mounted on the deflectors and located in advance of the transverse plane of the cutting mechanism, reels mounted for rotation on the vertical shafts, and gearing arranged within the deflectors and connected with the vertical shafts for rotating the reels.

6. A header including a frame, cutting mechanism carried by the frame, a front transverse shaft located below and in advance of the cutting mechanism, vertical shafts extending upwardly from the transverse shaft, gearing connecting the said shafts, and reels mounted on a vertical axis and having radial horizontal arms extending from the axis, said reels being operatively connected with the vertical shafts and arranged to flex or bend the grain over the cutting mechanism.

7. A header including a frame, cutting mechanism carried by the frame, a transverse reel driving shaft located below and slightly in advance of the cutting mechanism, deflectors mounted on the frame and arranged above the cutting mechanism, vertical shafts journaled at their upper portions in the deflectors and operatively connected at their lower ends with the reel driving shaft, reels having vertical shafts mounted on the deflectors, said reels having radial horizontal arms, and gearing arranged within the deflectors and connecting the said vertical shafts.

8. A header comprising a frame, cutting mechanism, brackets mounted on the frame at the front thereof, deflectors secured at their rear ends to the brackets and supported by the same above the plane of the said frame, braces extending from the frame to the front portions of the deflectors, reels mounted on the deflectors and located above the same, each reel rotating on a vertical axis and having radial horizontal arms extending from the axis, and gearing for rotating the reels.

9. A header including a frame, a transverse conveyer mounted on the frame, a transmission shaft extending across the frame in rear of the conveyer, a reel driving shaft extending across the frame in front of the conveyer, gearing for connecting the conveyer and the reel driving shaft with the transmission shaft, cutting mechanism carried by the frame and located at the front thereof, deflectors projecting from the frame, reels mounted on the deflectors each reel rotating on a vertical axis and having radial horizontal arms extending from the axis, and gearing connecting the reels with the said reel driving shaft.

In testimony, that I claim the foregoing as my own, I have hereto affixed my signature in the presence of two witnesses.

VICTOR LAUER.

Witnesses:
G. E. MOORE,
G. S. AUTRY.

Copies of this patent may be obtained for five cents each, by addressing the "Commissioner of Patents, Washington, D. C."